Patented Mar. 24, 1942

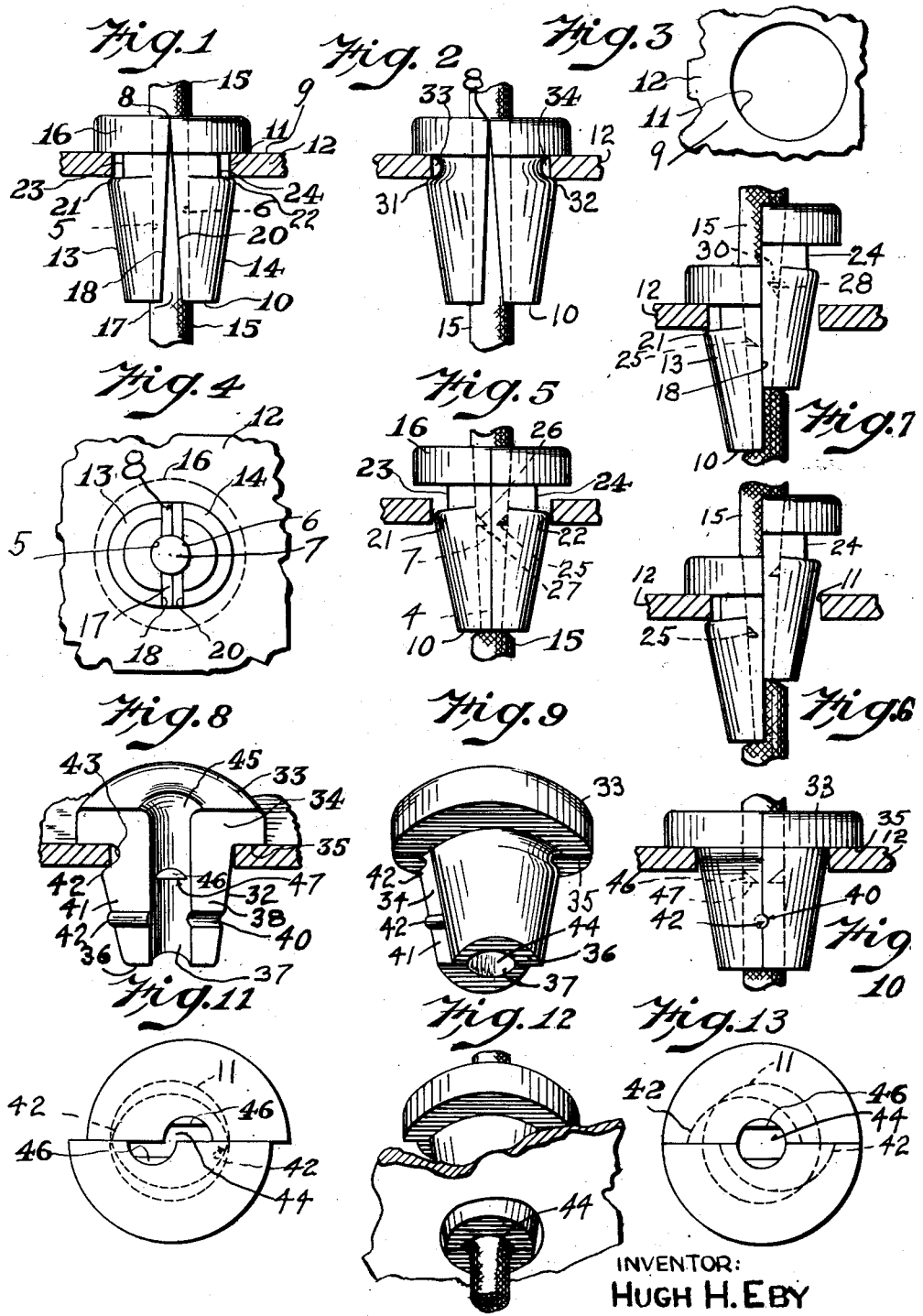

2,277,637

UNITED STATES PATENT OFFICE 2,277,637

GROMMET

Hugh H. Eby, Jenkintown, Pa., assignor to Hugh H. Eby, Inc., Philadelphia, Pa., a corporation of Pennsylvania Application May 15, 1939, Serial No. 273,745

7 Claims. (Cl. 174—153)

This invention relates to grommets.

It is among the objects of the invention: to improve the art of grommets; to produce an efficient and effective grommet of ease of application and of cheap and economical construction; to provide a molded two piece grommet; to combine with a grommet strain relief means; to provide an insulating grommet with strain relief elements holding a wire against undesired axial movement; to form a grommet of such construction that it can be associated embracingly about an insulated wire and held in a panel without extraneous anchoring devices; to provide a grommet utilizing the resilience of the insulation of an embraced connector for effecting anchoring of the grommet; to provide a grommet which is self locking in a panel; to provide a two part grommet arranged for mounting in a support without the use of threads; to provide a grommet for holding a wire connector against both tensile and torsional stresses; to provide a unitary molded element in a series any two of which are combinable to form a self-locking grommet; to provide a two part grommet arranged to pass into a panel aperture in one condition of relative adjustment of the parts and thereafter to assume a different relative adjustment of the parts in which the grommet is locked in the aperture; to provide a two part grommet in which the parts have relatively transversely slidable relation; to provide a two part grommet comprised of transversely relatively movable parts which in one position of adjustment can pass through an opening of predetermined size and outline, and in another position cannot pass through said opening, with yielding means for urging the parts toward the second mentioned adjusted position; and many other objects and advantages will become more apparent as the description proceeds.

In the accompanying drawing forming part of this description:

Fig. 1 represents a side elevation of an assembled split grommet according to one form of the invention, comprised of complemental identical portions divided at the bottom because of the resilience of the embraced cord a fragment of which is shown, with the halves assembled in the aperture of a panel shown in fragmentary section.

Fig. 2 represents a similar view of a slightly modified external form of the grommet.

Fig. 3 represents a fragmentary plan of a panel with a representative aperture in which the grommet is to be anchored.

Fig. 4 represents a bottom or reflected plan of the assembly of Fig. 1, with the cord removed.

Fig. 5 represents a side elevation of the two piece grommet of Fig. 1 in tightly assembled relation about a fragmentary cord with the widest part of the grommet passing into the aperture in the panel shown in fragmentary section, just prior to expansion to the form shown in Fig. 1 showing in dotted lines the closely spaced downwardly directed substantially wedge-shaped anchoring lugs engaging the insulation of the engaged cord in position to permit frictionally resisted axial movement of the cord downwardly through the grommet only, and to oppose retraction upwardly.

Fig. 6 represents a side elevation of the parts shown in Fig. 5 in an alternate intermediate position in which one portion enters the aperture in the panel prior to the other, and the latter moves into the aperture usually with the corresponding movement of the cord.

Fig. 7 represents a side elevation of a modified form of grommet having similar external contours to those of Fig. 1, but having internal wedge-shaped anchoring lugs extending in opposite directions and so arranged, following the intermediate position shown that while one portion is disposed in the aperture in the panel shown in fragmentary section, the other is above the opening to move down into the opening with the retracted cord so that the ultimate position will be as that shown in Fig. 1, but with one anchoring portion opposing axial cord movement in one direction while the other opposes it in the other direction, while the expanded insulation locks both portions to the panel.

Fig. 8 represents a perspective of a modified form of grommet portion having an extension or protuberance on one side only forming a locking shoulder for engaging under the lower face of the panel shown in fragmentary section, and showing a transverse guide recess on one side and the complemental guide rib on the other to form sliding body means minimizing relative axial movement of two complemental grommet portions.

Fig. 9 represents a perspective of an assembly of two of the grommet portions shown in Fig. 8 with their juxtaposed flat faces in contact and in laterally diametrically displaced relation to provide diametrically spaced locking shoulders for engagement under a panel, while the upper circular flange portions are formed into a substantially complete annular disc, in the position of the parts resulting from the expansion of expansive material (not shown) within the bore.

Fig. 10 represents a side elevation of an assembled juxtaposed pair of portions as shown in Fig. 8, mounted in the aperture of a panel shown in fragmentary section, showing the edge of the portions.

Fig. 11 represents a plan of the assembled pair of grommet parts or portions as shown in Fig. 8, and as assembled in Figs. 9 and 10 with the portions in laterally displaced relation so as to bring the locking protuberance of one portion into peripheral alignment with the non-protuberant surface of the mate of the pair, so that the shank portion has an extreme diameter slightly less than that of the aperture in the panel with which it is to be associated (shown in dotted lines), but in which the wire receiving bore has been so distorted that the insulation of the embraced wire (not shown), is compressed, and in seeking to expand urges the component parts toward lateral relative shift to a position in which the respective protuberances are re-extended under the panel to make the assembly self locking, as in Fig. 9.

Fig. 12 represents a perspective from below of the assembled grommet portions of Fig. 11, in a fragmentary portion of a panel, showing that the flange and bore parts are misaligned through lateral relative shift while the outer configuration beneath the flange assumes a substantial cylindrical form to pass into the panel opening.

Fig. 13 represents a plan of the grommet assembly of Fig. 9 after it has been pushed down into the panel aperture to a locking position and after the compressed insulation (not shown) has expanded to simultaneously force the flange portions into their annular registration to form a disc while the protuberances have been projected diametrically to form a total diameter larger than that of the associated aperture shown in dotted lines.

It is to be understood that the panel to which reference has been and will be made is not necessarily a panel in the strict technical sense of the word, as it will be seen to cover and include all sorts of stands, bases, supports, housings, enclosures and the like, to or through which an electrical connector is to extend. The walls having the mounting apertures to be referred to may be of varying thickness and be planar or curved cylindrically or spherically.

Referring to Figs. 1 and 4 a grommet is disclosed mounted in the aperture 11 and in the panel 12. The grommet is comprised of preferably identical mutually presenting halves, 13 and 14, each having an upper flange portion 16 forming with its component a complete flange disc arranged in final position to abut the upper surface 9 of the panel 12. Grommet portion 13 has a planar meeting face 18 extending preferably full length, and the companion portion 14 has a similar face 20. The respective faces are centrally longitudinally grooved with a tapering channel respectively 5 and 6 with the deepest portion of the grooves at the flange ends, so that when the portions 13 and 14 are placed with flanges 16 in alignment with faces 18 and 20 in abutting confronting position contacting or approaching contacting relation throughout their length (Fig. 5) a closed tapering channel 7 is formed having a substantially cylindrical end at the upper flange 16, and a small end 4 at the lower end 10, of the portions. The channel portions or grooves are so disposed moreover that the separation of the lower ends 10, of the respective grommet parts about a pivot or substantial pivot point 8 substantially in the plane of the flange 16, moving the juxtaposed faces 18 and 20 into an angular relation spaced by the generally triangularly or wedge-shaped gap 17, causes the groove elements to move into substantial parallelism and having substantially the same clearance throughout. The cord 15 of predeterminedly usually slightly larger diameter than the cylindrical end of channel 7 is then substantially uniformly constricted and frictionally engaged by the channel surfaces throughout the length of the grommet. Obviously when the parts are forced together to the position shown in Fig. 5, the more or less resilient insulation on the cord is compressed to a high degree and an urge separating the grommet components is developed, which finds effect in moving the elements to the position shown in Fig. 1 for locking, as will be described.

Each grommet portion 13 and 14 has an external taper rising from the small end 10, at least centrally symmetrically of and perpendicular to the respective faces 18 and 20, attaining its greatest width at the shoulders respectively 21 and 22, separated from the respective flanges 16 by the undercuts or recesses respectively 23 and 24.

It will be clear that with the parts forced together as shown in Fig. 5, constricted upon the wire connection or cable 15, the assembly can be forced axially downwardly until the shoulders 21 and 22 have cleared the surfaces of aperture 11, pursuant to which there will be an automatic expansion due to the resilience of the insulation on the connector 15, which will force the shoulders 21 and 22 under the lower surface of the panel 12, with the edges of the panel adjacent to the hole engaging in the respective recesses 23 and 24. It will be observed that the grommet will still have retained a good frictional engagement with the cord, while at the same time and automatically the grommet will have snapped into locked engagement with the panel. This represents one phase of a principle of providing relatively movable parts which in one position can pass through an opening of predetermined size and outline, and in another position cannot pass through said opening, and utilizing the resilience of the wire insulation itself for the force to move the parts automatically from one such position to another.

It will be apparent that the grooves of the parts so far described may be mere channels, relying upon friction alone for the grip, or the friction may be enhanced or increased by suitably contouring the grooves, or by filling them with teeth, serrations, lips and the like as illustrated in dotted lines in Fig. 5. In the latter figure in the simplest form a single wedge-shaped detent or pawl 25 is provided in each channel. Preferably the pawl is axially inclined having a tapered upward end 26, and a transverse engaging face 27. As it is an advantage to have the complemental halves identical, for reasons of economy and simplicity in assembly, the two opposed teeth will extend toward each other and dig into the cable in such a positive degree that although interposing merely a certain added frictional resistence to the movement of the cable axially of the grommet in one direction, illustratively downwardly as disclosed, it effects practically a positive lock against undesired retraction of the cord in the other axial direction.

The presence of the increased frictional effects due to the toothed detent or otherwise leads to another manner or mode of associating the parts, as shown in Fig. 6. In that figure one grommet portion 13 is first mounted in the aperture 11, then the other portion 14 is associated with the cable 15 above the opening, as shown. Thereupon the downward movement of the cable and the complemental portion 14 together brings the second half into its proper laterally aligned position to be sprung laterally into locked engagement in the manner already described.

In the form shown in Fig. 7, non-duplicate halves are provided, at least to the degree that the left hand portion has the same tooth or wedge 25 facing downwardly, while the right hand one has the tooth 28 presenting upwardly, and so arranged that the transverse face 30 thereof is arranged to engage in the insulation on cord 15 to prevent the cord from being pulled downwardly relative to said right hand portion. It will be evident that downward pull on the cord in Fig. 7 carries the right hand portion with it, to a final locking position in lateral alignment with the left hand element, as will be clear, locked to the panel, and resisting movement of the cord in either direction relative to the locked grommet. The lock in both directions being as an incident to the upward and downward presentation of the respective pawls, teeth or detents.

The form of the invention shown in Fig. 2 represents a modification of the device of Fig. 1 in the outer configuration only, in the fact that the shoulders 31 and 32 are a bit more rounded than those of Fig. 1, and the recesses 33 and 34 are slightly arcuate in place of the angular disclosure of Fig. 1. The structures are otherwise the same, preferably, one advantage of Fig. 2 lies in the fact that various thickness of panel may be accommodated with the curved edges of the recesses.

In all of the forms thus far described, it will be evident that the two halves may be more or less tightly clamped about the cord until the smaller ends 10 have been constricted to the point of easy entry into the panel opening 11, and that thereafter a steady pull on the cord will bring the outer tapering surfaces of the assembly against the sides of the aperture 11 whereby they are forced closer about the cord compressing it more and more until the widest point, transversely through the shoulders passes the opening, which is followed by the prompt expansion forcing the parts apart and the shoulders under the panel to locked position. At the same time enough frictional engagement of the parts with the cord remains to hold the cord against axial movement of the grommet. The parts may be internally treated so as to increase the frictional engagement of the grommet on the cord, as has been suggested.

In the form of the invention shown in Figs. 8 to 13, a main alternative form is disclosed in which the parts instead of having separating movement about a substantial pivot lying in the meeting faces, separate by lateral relative shift while maintaining face contact as will be described.

Referring to Fig. 8 a molded or otherwise formed element 32 is provided comprising an upper semi-cylindrical half flange 33 terminating in the planar or substantially planar longitudinal face 34 perpendicular to the flange and said flange having a lower surface 35. The generally tapering semi-conoidal shank extends from the lower surface 35 of the flange to termination in the bottom end 36 is formed about the generally semi-cylindrical groove 37 extending the full length of the element, and preferably although clearly not essentially substantialy normal to the plane of the flange, as will be clear.

The face 34 on one side of the shank beside the groove forms a generally tapered leg 38 extending directly from the under surface 35 to the lower terminal, and preferably contains a transverse groove 40 molded into it. The face on the other side of the element from leg 38 has a thicker enlarged leg 41 having a generally rounded shoulder 42 leading to the undercut locking recess 43 separating the shoulder 42 from the under surface 35 of the flange. This, as is shown in the upper half of Fig. 13 causes the diameter at the shoulder in the plane of the face 34 to be appreciably greater than it is transversely to said face. The left leg 41 preferably includes a protuberant transverse rib 42, a complement of the groove or recess 40 of the other leg. The grooves 37 when disposed in confronting or substantially confronting relation depending upon the angle of the groove components to the flange element, as to whether they are normal or off normal forms a closed cord receiving channel 44. Each groove preferably emerges upon the upper face of the flange by a flaring mouth 45 and preferably contains a transverse ridge or anchoring tooth 46 presenting downwardly the substantially perpendicular face 47.

It will be obvious that when the element of Fig. 8 is provided in identical duplicate and arranged in reverse juxtaposed relation, with and embracing a cord 15 having a resilient insulating covering which is compressible, at least in part, the urge to expand will cause the parts to move in a laterally diametrical shift such that the groove 44 is as nearly uniform internally as possible so that the distortion of the insulation of the cord will be a minimum. This will be the relative position of the parts shown in Figs. 9 and 13, in which the flange components will form a substantially complete annular disc, and with the aperture or groove 44 substantially concentric therewith. As, however, this disposition of the parts finds the shoulder portions 42 of the respective portions extending radially or diametrically beyond the adjacent juxtaposed unshouldered leg 38, there is provided a transverse width of appreciably greater extent than the diameter of the aperture 11 in the panel 12 with which it is to be associated. The assembled grommet would not therefore be able to pass freely into the aperture 11 because the shoulders 42 each extend radially beyond the aperture, as shown in dotted lines in Fig. 13. Of course, conversely, if the grommet were mounted in the aperture 11 and expanded to the position indicated in Fig. 13, the grommet could not be successfully and easily withdrawn from the aperture because of the engagement of the respective shoulders 42 beneath the lower surface of the panel, with the engagement of the composite flange with the upper surface 9 of the panel.

In order to facilitate assembly the parts are forced in mutually diametrically lateral displaced relation to the position shown in Figs. 11 and 12, so that the barrel of the composite grommet has no diameter as great as that of the aperture 11 in the panel 12, so that the respective shoulders 42 are withdrawn to substantial alignment with the juxtaposed unshouldered positions 38. In the rather exaggerated disclosure of Fig. 11 it will be seen that such lateral displacement effects a marked distortion and compression, with a consequent resilient urge to return to its initial shape, and thus to exert a resilient urge on the parts to cause re-displacement laterally, to the locked position of Fig. 13.

It will be apparent that the transverse rib and complemental groove on the juxtaposed grommet portions will enable free and easy transverse sliding, while militating against relative axial motion of the parts. It will be understood however, that in the broadest aspects of the invention the ribs need not be provided. The relation of panel aperture 11 to the assembled grommet in such as to militate against separation of the parts except in the direction predetermined. Obviously the type of grommet shown in Figs. 8 to 13 can be positioned and locked automatically by engaging the cord and the juxtaposed portions, then moving the grommet portions axially downwardly through the slot or aperture, using the sides of the aperture to force the shoulder portions, and thus the grommet components, back until the parts are in the positions shown in Fig. 11, after which the further axial insertion permits automatic expansion and locking, as should be clear.

The grooves and the completed channels have been shown in purely illustrative form to be generally cylindrical. Obviously the invention is not so restricted, as the assembled channel may be oval or cylindrical, or angular (not shown), in accordance with demands, and the cross sectional profile of the cord with which it is to be assembled.

I claim as my invention:

1. A grommet arranged for axial entry into an aperture, formed of two identical complemental portions, each portion being generally tapered from a large end to a small end and including a substantially planar face extending substantially the length of the portion, a flange at one end of the portion substantially normal to said face, a shoulder formed on said portion spaced from the flange by a recess, the planar face having a longitudinal groove containing a longitudinal axis of the portion, the thickness of the portion at the shoulder relative to said axis being greater through one axial plane than through an axial plane normal thereto, the shoulder merging into the remainder of the portion away from the flange with a sloping surface generally acutely angularly divergent from the axis so as to be guidably slidable into an aperture in response to axial thrust on said portion, the groove being so disposed in the portion that when complemental portions are in juxtaposed relation with their respective faces in confronting relation the grooves define a cord receiving channel while the shoulders thereof have a generally oval or elongated profile having substantially a relatively long and a relatively short dimension variable in the long dimension thereof as the respective portions relatively move to change the effective cross sectional area of the channel.

2. In combination with a cord having a compressible resilient insulation of predetermined cross sectional area, a panel having an aperture through which the cord extends, a two piece grommet arranged for axial entry into said aperture in cord retaining anchoring relation comprising complemental portions, one portion having a substantially planar longitudinal face having a longitudinal groove and having a lateral locking recess and disposable in the aperture in interlocked engagement with the panel to leave a substantial segment of the aperture open, the other of the complemental portions being generally tapered from a large end to a small end and including a longitudinal substantially planar face extending substantially the length of the portion, a flange at one end of the last mentioned portion substantially normal to said face, a shoulder formed on said last portion spaced from said flange by a recess, said last mentioned planar face having a groove containing a longitudinal axis of the portion, the thickness of the last portion at the shoulder relative to said axis being greater through one axial plane than through an axial plane normal thereto, the shoulder merging into the remainder of the last portion by a sloping surface generally acutely angularly divergent from said axis so as to be guidable slidably into the open segment of said aperture in response to axial thrust on the last portion, the grooves in the complemental portions being so disposed that when juxtaposed with the respective faces in confronting relation the grooves define a cord channel always in assembly of predetermined cross sectional effective area less than that of the cord and its insulation so as to compress said insulation, the axial sliding of the last mentioned portion forcing the portions together to compress the cord insulation to a maximum as the shoulder is guided past the edge of the opening of the aperture and the alignment of the recess with the edge of the aperture permitting expansion of the insulation to force the last portion into locking engagement with the panel while the anchored position finds the compression of the insulation maintaining to prevent relative slipping of the cord and assembled grommet.

3. In combination a grommet arranged for axial entry into an aperture, formed of two identical complemental portions, each portion being generally tapered from a large end to a small end and including a substantially planar face extending substantially the length of the portion, a flange at one end of the portion substantially normal to said face, a shoulder formed on said portion spaced from the flange by a recess, the planar face having a longitudinal groove containing a longitudinal axis of the portion, the thickness of the portion at the shoulder relative to said axis being greater through one axial plane than through an axial plane normal thereto, the shoulder merging into the remainder of the portion away from the flange with a sloping surface generally acutely angularly divergent from the axis so as to be guidable slidably into an aperture in response to axial thrust on said portion, the grooves being so disposed in the portions that when complemental portions are in juxtaposed relation with their respective faces in confronting relation the grooves define a cord receiving channel of predetermined effective cross sectional area while the shoulders thereof have a generally oval or elongated profile having substantially a relatively long and a relatively short dimension variable in the long dimension thereof as the respective portions relatively move to predeterminedly change the effective cross sectional area of the channel, and a cord having resilient compressible insulation of a total effective cross sectional area predeterminedly greater than the effective cross sectional area of the channel in two extreme positions of relative adjustments of the portions so as to exert expansive force on said portions to urge them separatingly apart to urge the shoulders toward their longer profile dimension.

4. In combination with a cord covered with compressible resilient insulation of a predetermined total effective cross sectional area, a grommet formed of two identical substantially rigid and non-compressible portions, each portion including a flange and a shoulder in spaced relation axially of the grommet, and having a partial substantially axial cord channel groove of less than half of the effective cross sectional area of said cord, the portions being assembled in relatively movable relation with the grooves forming a cord channel embracing said cord and continuously compressing the insulation thereof in assembly, said portions in assembly being relatively movable in both directions between two extreme positions in one of which the effective cross sectional area of the cord channel is a minimum and the cord insulation is compressed to a greater degree than in the other extreme position in which the effective area of the cord channel is greater and said portions being so constructed and arranged that in the position of greatest compression the transverse distance between the shoulders is appreciably less than it is in the second mentioned position in which the continuing cord compression is lessened whereby anchoring of the grommet in a support and of the cord in the grommet are both functions solely of the compression and resilience of said insulation.

5. In combination with a cord having compressible resilient insulation of predetermined cross sectional area, a panel having an aperture through which the cord extends, a two part grommet comprising permanently independent and detached substantially semi-conoidal substantially rigid and non-compressible elements each having one end larger than the other and having a surface to compressingly engage the cord and each having a recessed external portion arranged in one mutually relatively adjusted position of the elements to engage the aperture in said panel, the outer surface of each grommet portion including a sloping guiding surface leading to the edge of the recess, said elements being juxtaposed and arranged for relative movement between one position in which the recessed external portions are relatively retracted to a transverse dimension not greater than said aperture while the insulation of the cord is relatively squeezed by reaction of the sloping surface on the edge of the aperture responsive to external axial pressure and the first mentioned position in which the recesses are relatively extended and the cord is squeezed relatively less in response to release of the external pressure and expansion of the insulation of the cord whereby the cord is frictionally held by the maintained pressure and simultaneously the two piece grommet is resiliently urged apart to maintain the engagement of the recesses with the aperture edges.

6. In combination, a panel having an aperture, a cord comprising resilient compressible material of predetermined effective cross sectional area and a grommet having a transverse exterior groove and comprised of a plurality of substantially rigid and non-compressible segments, said segments each having a substantially planar face for confronting juxtapositioning to the other and having a groove complementary of the other to form a cord channel always of predeterminedly less effective cross sectional area than that of the cord and being arranged for juxtaposition in assembly and for close relative positioning such as to permit the grommet to pass through the aperture until the transverse groove is aligned with the edge of the aperture, said segments being disposed embracingly about the cord with the cord in the channel and their relative positioning changes being a function solely of the resilient compressibility of said cord, said segments being relatively adjusted to a secondary relatively separated position as an incident of such cord expansion after the groove is aligned with the panel edge to cause the groove to receive the panel surrounding the aperture to lock the grommet to the panel and the cord in the grommet.

7. A grommet comprised of two complemental portions, one portion having a substantially plane face and a substantially normal flange, a groove extending axially of the portion in the face, the portion being substantially semi-conoidal externally and including a lateral protuberance having a high point closely adjacent to said face in spaced axial relation to said flange and said portion tapering from the high point of said protuberance in a guiding slidable surface to the end remote from the flange.

HUGH H. EBY.